United States Patent
Rolf

(10) Patent No.: US 9,704,152 B1
(45) Date of Patent: Jul. 11, 2017

(54) MOBILE PAYMENT SYSTEMS AND METHODS

(71) Applicant: GoFigure Payments, LLC, Overland Park, KS (US)

(72) Inventor: Devon A. Rolf, Overland Park, KS (US)

(73) Assignee: GoFigure Payments, LLC, Overland Park, KS (US)

(*) Notice: Subject to any disclaimer, the term of this patent is extended or adjusted under 35 U.S.C. 154(b) by 0 days.

(21) Appl. No.: 15/469,662

(22) Filed: Mar. 27, 2017

Related U.S. Application Data

(63) Continuation of application No. 14/961,120, filed on Dec. 7, 2015, now Pat. No. 9,633,348, which is a continuation of application No. 13/554,586, filed on Jul. 20, 2012, now Pat. No. 9,235,831, which is a continuation of application No. 12/964,378, filed on Dec. 9, 2010, now abandoned, which is a continuation of application No. 12/956,822, filed on Nov. 30, 2010, now abandoned, which is a continuation-in-part of application No. 12/902,798, filed on Oct. 12, 2010, now abandoned, which is a continuation-in-part of application No. 12/428,282, filed on Apr. 22, 2009, now abandoned.

(51) Int. Cl.
*G06Q 20/32* (2012.01)
*G06Q 20/20* (2012.01)
*G06Q 40/02* (2012.01)

(52) U.S. Cl.
CPC ....... *G06Q 20/3223* (2013.01); *G06Q 20/206* (2013.01); *G06Q 40/025* (2013.01)

(58) Field of Classification Search
None
See application file for complete search history.

(56) References Cited

U.S. PATENT DOCUMENTS 7,856,387 B1 12/2010 Rolf
2003/0047602 A1 3/2003 Iida et al.

*Primary Examiner* — F. Zeender
*Assistant Examiner* — Denisse Ortiz Roman
(74) *Attorney, Agent, or Firm* — Erise IP, P.A.

(57) ABSTRACT

A method includes providing a first payment account that is issued by a first financial institution and enables an accountholder thereof to make payments at merchants via a closed-loop payments network corresponding to the first financial institution and mobile person-to-person payments using the payment account. The method includes enabling a second payment account that is issued by a second financial institution to be electronically linked to the first payment account and used as a source of funds. The method includes providing a mobile operating system and enabling a plurality of merchant-specific payment accounts to be associated with a mobile communications device having the operating system. The method includes determining whether a merchant-specific payment account that is accepted only by a particular merchant is available to the accountholder via the mobile communications device and receiving a fee when the first payment account is used for a purchase.

19 Claims, 9 Drawing Sheets

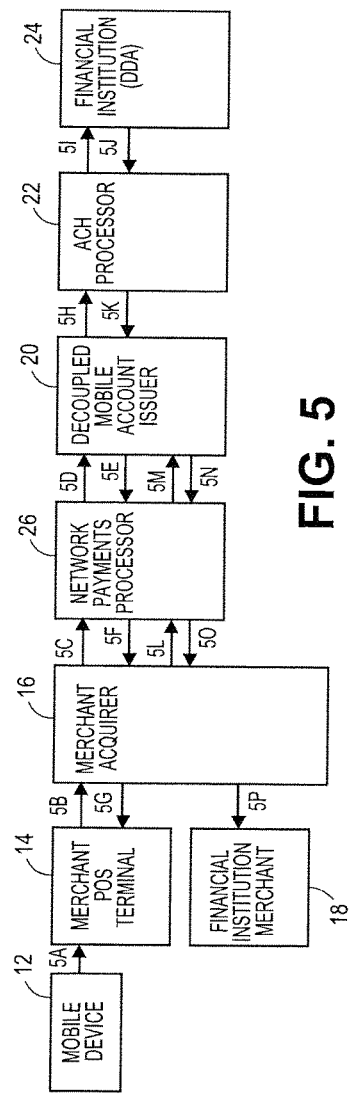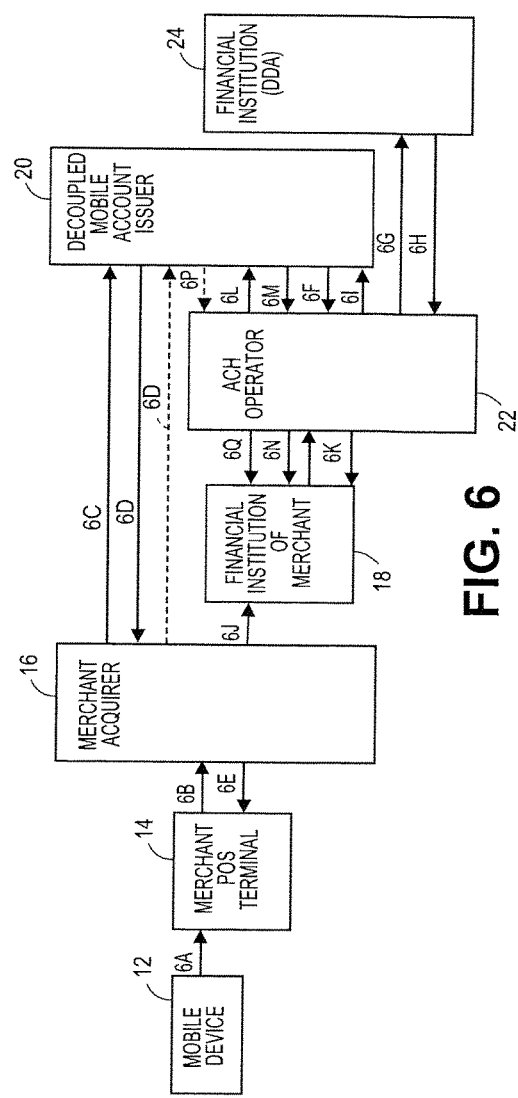

MOBILE PAYMENT SYSTEMS AND METHODS

RELATED APPLICATIONS

This application is a continuation, and claims priority benefit with regard to all common subject matter, of earlier-filed U.S. patent application Ser. No. 14/961,120, filed Dec. 7, 2015, and entitled "MOBILE PAYMENT SYSTEMS AND METHODS" ("the '120 application"). The '120 application is a continuation, and claims priority benefit with regard to all common subject matter, of earlier-filed U.S. patent application Ser. No. 13/554,586, filed Jul. 20, 2012, now U.S. Pat. No. 9,235,831, issued Jan. 12, 2016, and entitled "MOBILE PAYMENT SYSTEMS AND METHODS" ("the '831 patent"). The '831 patent is a continuation, and claims priority benefit with regard to all common subject matter, of earlier-filed U.S. patent application Ser. No. 12/964,378, filed Dec. 9, 2010, and entitled "METHODS FOR ENROLLING IN A PAYMENT ACCOUNT AND PROCESSING A PURCHASE TRANSACTION," ("the '378 application"). The '378 application is a continuation, and claims priority benefit with regard to all common subject matter, of earlier-filed U.S. patent application Ser. No. 12/956,822, filed Nov. 30, 2010, and entitled "METHODS FOR ALLOCATING RISK AND FEES IN MOBILE PAYMENTS" ("the '822 application"). The '822 application is a continuation-in-part, and claims priority benefit with regard to all common subject matter, of earlier-filed U.S. patent application Ser. No. 12/902,798, filed Oct. 12, 2010, and entitled "METHODS FOR ALLOCATING RISK AND FEES IN MOBILE PAYMENTS" ("the '798 application"). The '798 application is a continuation-in-part, and claims priority benefit with regard to all common subject matter, of earlier-filed U.S. patent application Ser. No. 12/428,282, filed Apr. 22, 2009, and entitled "SYSTEMS, METHODS AND DEVICES FOR FACILITATING MOBILE PAYMENTS." The identified earlier-filed non-provisional patent applications are hereby incorporated by reference in their entirety into the present application.

BACKGROUND OF THE INVENTION

Field of the Invention

The present invention relates generally to systems, methods and devices for facilitating a value exchange. More particularly, the present invention relates to systems, methods and devices for facilitating payments made with a mobile wireless communications device.

Mobile payments systems, methods and devices for enabling person-to-person, remote or local purchases are known. For example, person-to-person wireless payments may be made using wireless messaging (such as SMS), remote payments may be made using the wireless Internet, and local proximity payments made at a point-of-sale terminal in proximity to the mobile device may be made using a radio-frequency identification device, such as may be implemented using Near Field Communications (NFC) technology, in the mobile wireless communications device. Known mobile payments systems, methods and devices may be found in U.S. Pat. No. 7,376,583 B1, assigned to the assignee of the present inventions, and incorporated herein by reference.

SUMMARY OF THE INVENTION

The present invention provides decoupled payment systems, methods and devices that enable an accountholder of a first account associated with the mobile device, its operating system, or a wireless service associated with the mobile device (i.e., the mobile payment account) to associate a second, preferred bank deposit account (known as a Demand Deposit Account or DDA) of the accountholder with the first mobile payment account. In particular, the present invention provides systems, methods and devices that enable an issuer of the mobile payment account to authorize a purchase transaction made with the first account via a mobile wireless communications device and to then separately retrieve funds for the purchase via a separate transaction, such as via the Automated Clearing House (ACH) network from the DDA of the accountholder, such that the issuer of the mobile payment account has the money available to settle the purchase transaction made with the mobile payment account. In other words, the mobile payment account of the present invention is decoupled from the Demand Deposit Account (DDA) of the accountholder.

According to one aspect of the invention, a mobile wireless communications device and/or service user enrolls in a decoupled debit program provided by or in association with a wireless carrier, mobile device manufacturer, and/or mobile operating system provider. The enrollment process includes entry by the user of a preferred payment account that is associated with a mobile payment account provided by or in association with the wireless carrier, mobile device manufacturer, or mobile operating system provider. In one embodiment, the user enters an identifier corresponding to his or her debit card number as the second payment account to be associated with the mobile payment account. Such a debit card number may be a number provided by an open-loop payment network provider, such as Visa or MasterCard, or a closed-loop network provider such as American Express or Discover. Alternatively, the user enters an identifier corresponding directly to his her demand deposit account, such as a bank routing number and account number.

According to the invention, when a user uses his or her mobile communications device to make a purchase, an identifier corresponding to the mobile payment account is wirelessly transmitted to the point of sale terminal (such as by NFC for a local proximity payment) or to a remote server for an online purchase (such as by the Internet). The identifier is transmitted to the issuer of the mobile payment account for authorization. Depending on the embodiment of the invention, such transmission may be sent directly to the issuer via a merchant acquirer or may be sent by way of an additional payment processor or network provider. Additionally, the acquirer and/or processor and/or issuer may conduct risk analysis, such as fraud analysis or insufficient funds risk. Upon authorization, an authorization signal is transmitted back to the point of sale terminal, which authorization signal may transmit directly to the merchant acquirer or via a payments processor or network, depending upon the embodiment of the invention.

Additionally, the issuer of the mobile payments account receives information indicative of the merchant at which the transaction is being made as well as the monetary amount of the transaction. Additionally, the issuer of the mobile payments account retrieves from a memory of a system of the present invention the identifier corresponding to his or her second payment account. Using that identifier, the issuer of the mobile payments account then automatically initiates, via the ACH network, a request for funds corresponding to the monetary amount of the transaction from the demand deposit account corresponding to the second account identifier. The funds are transferred from the accountholder's DDA to the issuer of the mobile decoupled payments account where the funds are available for settlement of the purchase transaction. Upon receipt by the issuer of the mobile payments account of an electronic settlement request, the funds corresponding to the purchase transaction, discounted by any fee charged by the issuer of the mobile payments account, are transmitted from the issuer of the mobile payments account for deposit in a bank account of the merchant. Additional fees may be taken from the amount to be deposited by a merchant acquirer and, depending upon the embodiment of the invention, any additional payments processor/network in the flow of processing.

More specifically, in one embodiment of the present invention the mobile payments account is a debit account that is associated with an open- or closed-loop payments processor/network, such as Visa, MasterCard, American Express or Discover. Payments made using such networks include fees, including an interchange fee charged by the issuer of the account which, in the case of this embodiment of the present invention, is (or is affiliated with) a wireless carrier or mobile device manufacturer. When the accountholder of the mobile payments account uses his or her mobile payments account to make a purchase, such as by using his or her mobile device in one of the manners described, an identifier that identifies the payment network associated with the account is stored in the mobile device and is transmitted to the point of sale terminal or server at which a purchase is being made. That identifier, preferably along with information that identifies the merchant and the monetary amount of the purchase, is received by a merchant acquirer who identifies the corresponding network by the identifier and transmits the information to the payments network (such as Visa or MasterCard). Alternatively, the identifier in the mobile device identifies the device itself (or the mobile subscriber) and that identifier is used (such as at the merchant acquirer) to identify a corresponding payments network and account number/identifier. The payment is authorized or declined (by the network/processor or by transmitting it to the issuer of the mobile payments account who authorizes or declines the purchase) and a signal indicating the authorization or denial is sent back to the point-of-sale terminal.

In accordance with the invention, the issuer of the mobile payments account receives the information regarding the purchase and, for an approved transaction, initiates a request, via the ACH network, to pull funds from the DDA associated with the decoupled mobile payments debit account. Upon receipt of the funds, they are held available for settlement of the purchase transaction. The purchase transaction is then settled, such as by receipt at the mobile decoupled payments account issuer of an electronic settlement request (that may have been initiated via a batch file from the merchant acquirer of the merchant at which the purchase transactions was made) and the transaction is settled by transmitting funds from the issuer of the mobile payments account to a bank account of the merchant (minus any fees charged by the mobile payments account issuer or affiliated entities).

In an alternate embodiment, the decoupled mobile payments account is an ACH-direct account such that purchases made with the mobile device using the mobile payments account are processed directly through the ACH network. In particular, in this embodiment, the wireless subscriber or owner of the mobile device associates a Demand Deposit Account (DDA) directly with the mobile payments account, such as by entering a bank routing number and account number upon enrollment. When making a purchase using the mobile device, an identifier indicative of the mobile payments account is transferred to the point-of-sale (POS) terminal (such as by NFC) or to the remote server (such as by the wireless Internet) at which the purchase transaction is being made. Alternatively, an identifier indicative of the mobile phone or mobile subscriber is stored in the phone and transmitted to the POS terminal or server and that identifier is then associated with the mobile payments account (such as at the merchant acquirer by retrieval from a database of the mobile payments account information corresponding to the received identifier).

In this embodiment, using the received identifier indicative of the mobile phone, subscriber or mobile payments account, a merchant acquirer automatically determines the mobile payments account issuer and transmits the information regarding the attempted purchase directly to the issuer of the decoupled mobile payments account. The mobile payments account issuer accepts or declines the transaction (which decision may be made using risk assessment processes) and transmits a signal back to the merchant acquirer regarding approval or declination of the purchase transaction. When the transaction is approved, the decoupled mobile payments account issuer initiates an ACH transaction, such as via an ACH clearing house, to pull funds corresponding to the amount of the purchase from the DDA associated with the decoupled mobile payments account. Upon receipt of those funds by the mobile payments account issuer (or affiliated entity), the funds are held available for settlement of the purchase transaction. Upon receipt of a settlement request, the mobile payments account issuer electronically releases the requested settlement amount corresponding to the purchase transaction (minus any fees) for deposit in a bank account of the merchant.

In accordance with one embodiment of the invention, the settlement process involves the merchant acquirer (or merchant) transmitting the settlement data to a bank of the merchant, referred to herein as a Receiving Depository Financial Institution (RDFI), who initiates an ACH transaction for the funds from the mobile payments account issuer. The monetary funds corresponding to the amount of the purchase transaction (minus any fees/charges applied by the mobile payments account issuer and/or the ACH network/ processor) are transmitted to a bank account of the merchant at the merchant's bank (RDFI).

In an alternative embodiment, settlement of a mobile payments purchase transaction is made, such as in response to a settlement instruction received from the merchant or merchant acquirer, using an ACH push transaction in which the mobile payments account issuer, using the information received regarding the purchase transaction and accountholder's DDA account information, initiates an ACH credit transaction with the merchant's bank thus debiting the mobile payments account and crediting the merchant's bank account with funds corresponding to the purchase transaction (discounted by any applied fees).

It yet another ACH-direct embodiment of the invention, purchase transaction information is transmitted from the merchant acquirer to the merchant's financial institution and the merchant's financial institution initiates an ACH transaction process with mobile decoupled account issuer. Upon receipt, the mobile decoupled debit issuer holds that transaction and initiates an ACH transaction with the accountholder's DDA at the accountholder's financial institution for the amount of the purchase transaction. Following receipt of the funds, the held purchase transaction with the merchant's financial institution is settled.

In further embodiments of the invention, the mobile decoupled payments account may be associated with additional accounts, such as merchant-specific payment accounts. Each merchant-specific payment account is accepted only by the merchant corresponding to the merchant-specific payment account. Additionally, the mobile payments account itself can hold money. In accordance with the invention, an accountholder can fund his or her mobile payments account via a personal computer connected to the Internet or directly from the mobile device using his or her bank account, debit account or a credit account. Additionally, the accountholder can fund a merchant-specific payment account with a money transfer from the mobile payments account or from his or her bank account, debit account or credit account. Additionally, the mobile payment account can be used to make and receive person-to-person transfers such that money paid or given to the accountholder can be transferred directly into the mobile payments account. Additionally, others may transmit gift money directly to a specified merchant specific account associated with the mobile payments account.

In accordance with certain embodiments of the invention, when the decoupled mobile payments account is used to make a purchase transaction at a merchant, it is first determined whether a merchant-specific account corresponding to the merchant is associated with the decoupled mobile payments account. When such a merchant-specific account is associated with the mobile payments account and has funds (or has sufficient funds, depending on the embodiment) the merchant-specific account is used in processing the purchase transaction. When a merchant-specific account corresponding to the merchant at which the purchase transaction is being made is not associated with the mobile payments account (or it has insufficient funds, depending on the embodiment), it is determined whether the mobile payments account itself holds available funds (or holds sufficient available funds, depending on the embodiment). When the mobile payments account has available funds (or sufficient available funds), it is used in processing the purchase transaction. Otherwise, or additionally, a default account (such as a debit account corresponding to a Demand Deposit Account, a Demand Deposit Account directly, or a credit account) is used to process the transaction. It should be understood that certain embodiments of the invention enable split transactions which enable processing of the purchase transaction to use multiple accounts, such as when a merchant-specific account and/or the mobile payments account has available funds to process the purchase transaction but those funds are insufficient to settle the purchase transaction in its entirety. Alternatively, processing of the purchase transaction may use a merchant-specific account or the mobile payments account only when those accounts are sufficiently funded with available money to fully settle the purchase transaction.

BRIEF DESCRIPTION OF THE DRAWINGS

FIG. 5 is a flow diagram illustrating a value exchange transaction according to embodiments of the present invention;

FIG. 6 is a flow diagram illustrating a value exchange transaction according to embodiments of the present invention;

DETAILED DESCRIPTION

Figure 1:
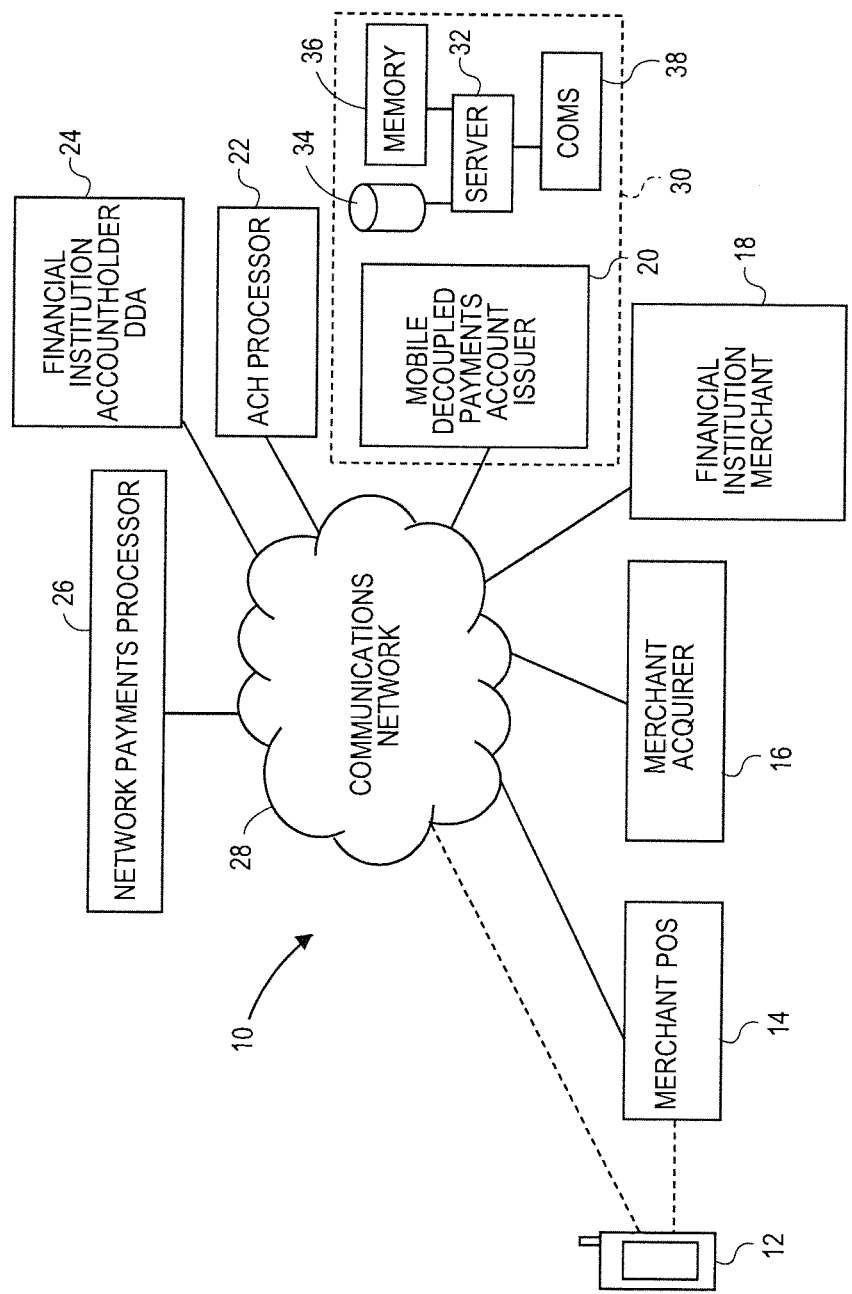
FIG. 1 illustrates a system and system environment of the present invention.

With reference initially to FIG. 1, systems and operating environments of the present invention are denoted generally by reference numeral 10. Illustrated are a mobile wireless communications device 12, a merchant point-of-sale (POS) terminal 14, a merchant acquirer 16, a merchant financial institution (FI) 18 of the merchant associated with the merchant POS 14, a mobile decoupled payments account issuer 20, an Automated Clearing House (ACH) processor 22, a financial institution (FI) 24 of the accountholder purchaser associated with mobile device 12 or a wireless carrier service associated with device 12, a network payments processor 26, and a communications network 28.

Mobile wireless communications device 12 may be any or a combination of a wide variety of mobile wireless communications devices, such as a cellular telephone, mobile media device, mobile Wi-Fi or WiMax communications device, satellite radio, mobile voice-over-IP (VOIP) device, etc. Merchant POS terminal 14 is, in one embodiment involving local proximity payments made with a mobile device 12, a check-out terminal at a retail location or a vending machine, fuel pump, etc. in physical proximity to the user and his or her mobile device 12. Alternatively, merchant POS terminal 14 may be a remote server for using in making online purchases with mobile device 12. In some but not necessarily all embodiments of the invention when merchant POS terminal 14 is a POS terminal at a physical retail store in proximity to the buyer, merchant POS terminal employs an IP address and transactions made at the POS terminal 14 are processed as online transactions even when made in a physical retail store. It should be understood, however, that this is a feature of one embodiment of the present invention and the present invention is not limited to such an embodiment or to transacting local in-store transactions as online transactions. Merchant Acquirer 16 is a merchant acquirer that processes payments transactions and provides payments-related services to the merchant associated with merchant POS 14. Merchant financial institution (FI) 18 is a financial institution, such as a bank, at which the merchant associated with POS terminal 14 has a bank account. Mobile decoupled payments account issuer 20 is an issuer of a mobile payments account that is decoupled from a payments account (such as a DDA) of the user held at the accountholder's financial institution (FI) 24. Mobile decoupled payments account issuer 20 may be a mobile carrier, a manufacturer of mobile devices, a provider of a mobile operating system, a combination of such entities, or an affiliate or associate of, or financial institution or payments transmitter relating to, such entities. ACH Processor 22 is an ACH clearinghouse for processing ACH payments. FI 24 is a financial institution, such as a bank, at which the user of mobile device 12 has a Demand Deposit Account (DDA). The Demand Deposit Account is a bank account in which the accountholder deposits monetary funds and from which the accountholder can make payments for purchases. As described herein, the account at FI 24 may be accessible for payments via a debit account (such as a debit card number) associated with a network payments processor 26, such as MasterCard, Visa, American Express or Discover, or may be accessible directly via an ACH transaction.

As illustrated, mobile decoupled payments account issuer 20 employs a system 30 which utilizes at least one server 32, a database 34, a memory 36, and communications capability 38. It will be understood and appreciated that, although not shown, the Merchant Acquirer 16, Merchant FI 18, ACH Processor 22, accountholder's FI 24, and network payments processor 26 also employ servers with databases, memory and communications capability. Communications Network 28 may be any of, or any combination of, a wide-area or local area landline or wireless network, such as a telecommunications network, the Internet, a cable-network, fiber-optics network, satellite network, cellular network may employ and support any or a variety of communications and encryption protocols for secure communications. It should also be understood that communications network(s) 12 is/are shown illustratively as a cloud and that the communications network(s) 12 and that processing of purchase transactions according to the present invention may involve use of separate networks.

Figure 2:
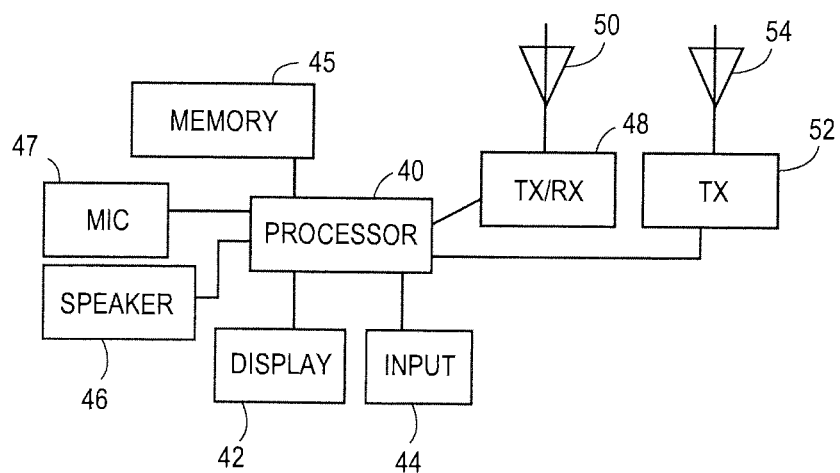
FIG. 2 illustrates a block diagram of a mobile communications device of the present invention.

With additional reference to FIG. 2, mobile communications device 12 is illustrated and described.

Mobile device 12 may be one or a combination of a number of devices, such as a cellular telephone, mobile communications device that communicates via a wireless local area network (such as Wi-Fi or WiMax), a mobile digital media player, voice-over-IP (VOIP) mobile communications device, etc. Mobile device 12 has a processor 40, a display 42, an input 44, a memory 45, a microphone 46, a speaker 47, a transmitter/receiver 48 with antenna 50, such as a cellular transceiver or local-area (such as Wi-Fi or Wi-Max) transceiver (the device 12 could have multiple transceivers operating on different RF frequencies), and a transmitter 52 with antenna 54, such as a radio frequency identification device (RFID). Transmitter 52 may operate according to Near Field Communications (NFC) standards. It should be understood that input 44 may be a key pad or touch screen (or the device could have both) and/or the device could utilize voice recognition to process vocal inputs made via microphone 46. In some embodiments, mobile device 12 may not have all of these components and in other embodiments additional components, such as a GPS receiver and/or digital camera, will be included. The components of mobile device 12 are powered by a battery, such as a rechargeable battery (not shown), all of which are housed in a housing (although device 12, depending on the embodiment, may include external speakers in the form of ear buds and/or external microphone on a headset).

A mobile payments software application is stored in memory 45 of the mobile device 12. Mobile payments software application may be integrated with an operating system of the mobile device or run on top of such an operating system. The mobile payments software application may come pre-loaded on the mobile device 12 or may be user-loaded onto the mobile device, such as by side-loading it from a personal computer that has downloaded the mobile payments software application from a remote source, such as server 32, or by wirelessly downloading the mobile payments application directly onto the mobile device from a remote source such as server 32.

Figure 3:
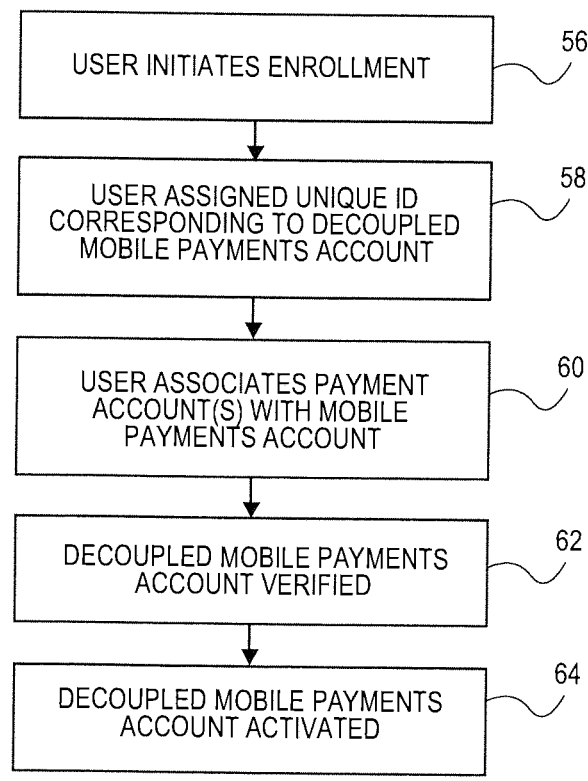
FIG. 3 is a flow chart illustrating enrollment and activation of a mobile decoupled payments account of the present invention.

With additional reference to FIG. 3, a flow chart illustrating a computer implemented enrollment method for enrolling an accountholder into a mobile decoupled payment account of the present invention is illustrated and described.

At step 56, a person associated with mobile device 12 initiates enrollment into mobile decoupled payment account of the present invention. In one embodiment, the person is a subscriber of wireless carrier services from a wireless service provider and the mobile device 12 is a handset that employs the carrier's wireless service. Enrollment into the mobile decoupled payment program of the present invention may take place online via a personal computer of the person or directly via the mobile device 12, such as via a hosted application that is hosted on server 32 at mobile decoupled payments account issuer 20, or may be made with the help of a remote operator, or may be made with the help of a store clerk at a store provided by or in association with the decoupled payment account issuer 20. The mobile decoupled payments account issuer 20 is preferably a, or associated with a, wireless carrier, a mobile device maker, or a provider of operating system software for mobile devices.

At step 58, a unique user identification is assigned to the enrolling accountholder. In one embodiment, this unique user identification is, or corresponds to, an account identifier (such as a telephone number or subscriber account number) associated with a wireless subscription provided to the enrolling person via mobile device 12. Alternatively, the mobile device 12 comes equipped with a unique identifier and, during enrollment, the enrolling person is assigned that unique identifier after identifying the specific mobile device being enrolled (such as by entry of a telephone number, account number, or serial number of mobile device 12) or after identifying the subscription service account which is then in turn used to retrieve the specific mobile device 12 of the user and its corresponding unique identifier. In this regard, database 34 may already contain information pertaining to the wireless subscription account of the enrolling party (including name, address, customer bank account information, telephone number associated with mobile device 12, the identity of mobile device 12 including model number and serial number), and that information or a portion of that information can be retrieved during the enrollment process for the purpose of aiding the process and assigning a unique identifier to the enrolling accountholder.

At step 60, the person enrolling into the mobile decoupled payments program of the present invention is prompted to enter a payment account for association with mobile payments account and, in particular, for association with the unique user identifier assigned at step 58. In particular, in one embodiment of the invention, the enrolling person is offered a choice of entering a debit account number, such as a Visa or MasterCard debit card or account number, or a bank account number (such as a bank routing number and account number). In alternate embodiments, only one or the other of these choices is given. In any event, the enrolling person enters an identifier that corresponds, either directly or indirectly, with his or her Demand Deposit Account (DDA) at a financial institution 24 at which the person has money on deposit.

In accordance with an aspect of the invention, a subscriber to mobile carrier services of a carrier may be prompted to enroll in the mobile payments account of the present invention when making an online payment of an invoice from the carrier. In particular, in one embodiment, when a customer is making a payment of a carrier's invoice (such as for a voice, data or voice/data plan) at a website of the carrier, the website offers the subscriber the opportunity to enroll in the payment account of the present invention. The offer may include information regarding the terms of enrollment and use of the account and/or may link to additional pages of the carrier's website or a related website to provide such terms and complete enrollment. In particular, the online enrollment system of the invention may provide an inquiry concerning whether the subscriber wishes to use the DDA being used to make payment as an account coupled with the mobile payment account of the present invention. Additionally, the subscriber's DDA being used to make online payment of the carrier invoice may be automatically placed in a field for entry of account information (with the system providing the ability of the subscriber to change the entered DDA with a different account).

It should be understood that, in a variation of this aspect of the invention, online bill payment for payment of a carrier's invoice may be initiated from the website of a financial institution corresponding to the DDA or from a website of a third-party payment service. It will be appreciated that the offer to enroll in the mobile payment account of the present invention may be made at such sites and that either the financial institution or the third party bill payment service may handle the enrollment process for the carrier. Alternatively, when bill payment is initiated from a website of a financial institution or bill payment service, the customer is linked to a website of the carrier (or carrier payments partner/service provider) when the customer selects to enroll in the mobile payment account of the invention or to receive additional information about the program. In such a case, information (such as account number) indicative of the DDA is preferably transmitted with the request for enrollment or request for additional information so that it is available for use in online enrollment (including automatic population in an entry field for an account number to couple with the mobile payments account into which the subscriber is enrolling or considering). It will be appreciated that a user's selection of an offer to enroll in a mobile payments account when making a bill payment may occur before or after the bill payment has been completed. It will be appreciated that information pertaining to the DDA may be stored in the session such that it is transmitted for mobile payment account enrollment purposes even after the bill payment has been concluded. Additionally, it should be understood that all information storage, website communications and transmissions, including transmissions from one server to another server via one or more networks employ security features including encryption.

In an alternate embodiment, enrollment into a payments account of the present invention is prompted from a website featuring an online savings program or brokerage services. In this regard, direct savings programs offered and accessible via an online website are known to enable electronic transfer of money from a bank account (Demand Deposit Account (DDA)) of an accountholder to the savings account. In accordance with the invention, information indicative of the DDA of the accountholder that is available to the source of the savings program may be used to enroll an accountholder into a payments account of the present invention. As described above, an offer or information describing the payments account may be provided on a web page corresponding to the direct deposit account (or enrollment into the direct deposit account). Entry by the account holder of information corresponding to a DDA (such as bank routing number and account number) may also be used to associate the accountholders DDA to a new payments account. Additionally, such information entered for purposes of a direct savings program may be automatically populated in one or more fields corresponding to the payments account of the present invention.

Additionally, a brokerage with online offerings may offer its accountholders the ability to transfer money from a brokerage account to a DDA of the accountholder. In accordance with the invention, information concerning the DDA of the accountholder that is used for the purpose of electronically transferring money to or from an online brokerage account may be used to enroll in the payments account of the present invention. As already described, offers and information relating to the payments account may be provided on a webpage of the online brokerage and information input by the accountholder for brokerage or money transfer purposes may be used during enrollment into the payments account of the present invention (such as retrieval of such information from a memory, display on a display, population into one or more fields, etc.) for associating the DDA with the new payments account. In any of these embodiments, the provider of the payments account of the present invention may offer rewards in the form of cash-back or points accrual for redemption of items where such rewards are funded at least in part from fees (such as interchange or interchange-like fees) generated by use of the payments account of the present invention.

At step 62, the decoupled mobile payments account is validated. This may occur, for example, by making one or more automatic entries (credits and/or debits) of small amounts into the Demand Deposit Account via the decoupled mobile payments account for subsequent confirmation by the accountholder. Account validation may occur in other manners.

At step 64, upon validation, the decoupled mobile payments account is activated and is ready for use by the now enrolled accountholder. Activation may be purely a server side function, such as when the unique identifier associated with the mobile payments account is pre-stored in the mobile device, or may include a client (mobile device 12) side activation step which involves server 32 transmitting an encrypted message containing the assigned mobile payments account identifier to device 12 for storage in memory 45 and use by the mobile payments application stored in device 12. In either event, embodiments of the invention preferably include transmitting a wireless welcome message (such as an SMS message) from server 32 to mobile device 12, which message may include instructions for use of the new mobile decoupled payments account.

With additional reference to FIGS. 4-7, computer-implemented methods and related systems for authorizing and settling payments made with the decoupled mobile payments account of the present invention are illustrated and described. As used herein in the context of a financial value exchange transaction according to the embodiments of the invention, the term debit means the money, or a record of the money, withdrawn from a bank account and the term credit means the money, or a record of the money, deposited to a bank account.

Figure 4:
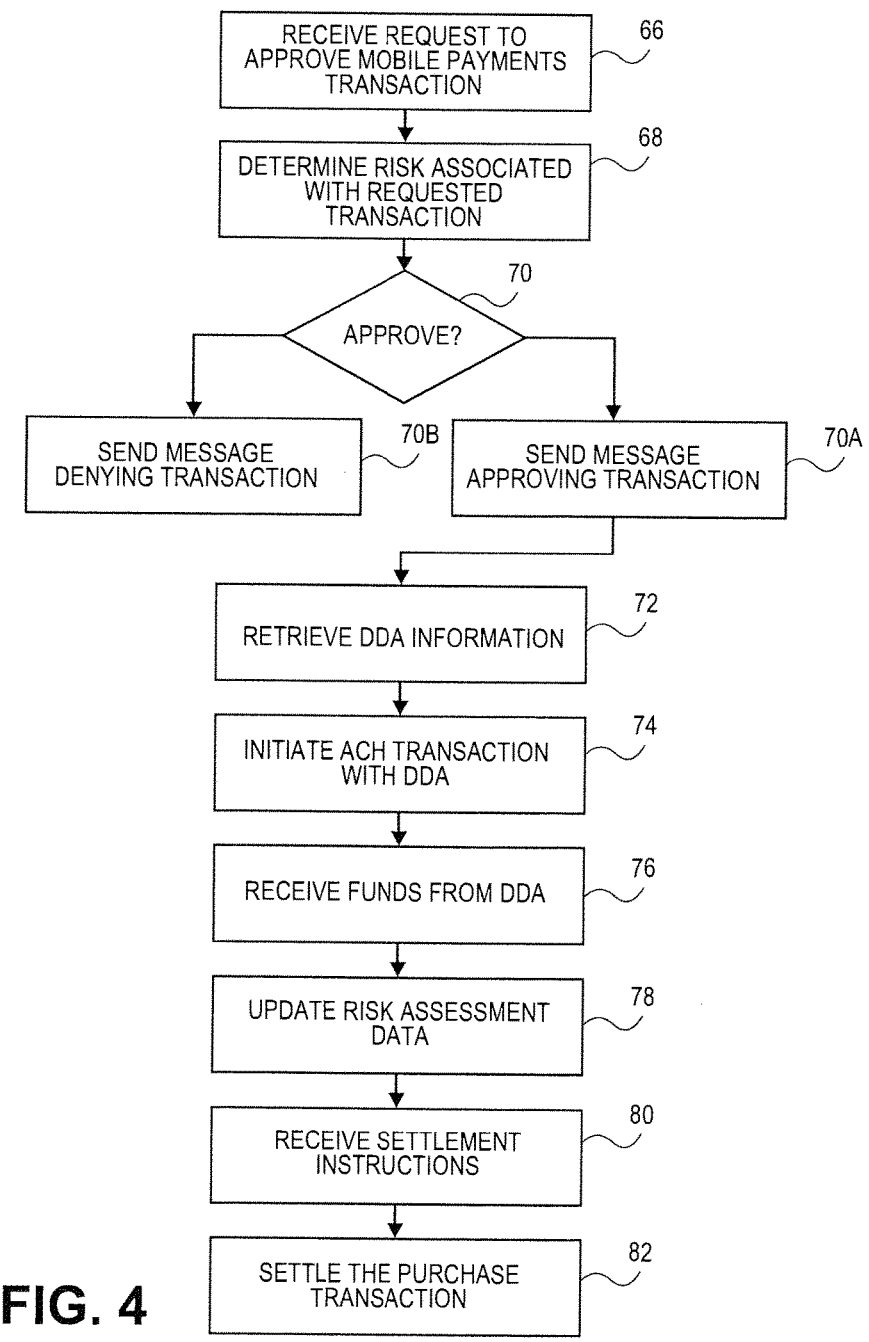
FIG. 4 illustrates a flow chart of computer-implemented methods for facilitating a value exchange and particularly authorizing and settling a mobile payments transaction.

With reference to FIG. 4, at step 66, mobile decoupled payments account provider 20 (or an entity associated with the decoupled payments account provider 20) receives at server 32 a request to approve a purchase transaction made at merchant POS terminal 14. At step 68, server 32 uses computer-implemented risk assessment models to determine a level of risk associated with approving the transaction. Such risk assessment models may take into account transaction history (including whether the accountholder had sufficient funds in its DDA account for prior transactions to make transactions), the location and amount of the purchase, credit rating, etc. Alternatively, the risk assessment is made at another location or entity and a result is transmitted to decoupled mobile payments account issuer 20. At step 70, a computer-implemented decision is made to approve or deny the purchase transaction based upon the risk assessment made or received at step 68. A message indicative of the decision to approve or deny the transaction is transmitted back to point of sale terminal 14 at corresponding step 70A or 70B.

For an approved purchase transaction, as indicated at step 72, information indicative of the mobile payments accountholder's DDA at financial institution (FI) 24 is retrieved from database 34 and, at step 74, mobile decoupled payments account issuer 20 initiates an ACH transaction to credit the mobile payments account with an amount of funds, from the accountholder's DDA account, corresponding to the purchase amount of the purchase transaction at POS terminal 14. In addition to a monetary amount associated with the purchase transaction, according to an aspect of the invention, information provided to the accountholder's financial institution (FI) 24 during the ACH transaction includes information pertaining to the purchase transaction, such as the identity of the merchant at which the transaction is made and date and/or time information associated with the transaction. In this way, the accountholder's bank statement from financial institution (FI) 24 will indicate at least mobile payments account issuer 20 as well as the merchant identity and monetary amount of the purchase transaction and preferably also the date associated with the purchase transaction.

At step 76, the funds are received at the decoupled mobile payments account issuer 20 via the ACH processor 22 and held until settlement instructions corresponding to the purchase transaction are received. Alternatively, a message indicating that there are insufficient funds to make the transfer is received. At step 78, decoupled mobile payments account issuer 20 updates risk assessment data relative to the accountholder based upon whether sufficient funds for settling the transaction were received. The updated data is used in risk assessment methodology during a subsequent use of the mobile payments account. At step 80, decoupled mobile payments issuer 20 electronically receives settlement instructions from the merchant acquirer 16 or merchant associated with the POS terminal 14 and, as indicated at step 82, decoupled mobile payments account issuer 20 participates in settlement of the purchase transaction. In particular, the mobile payments account of the accountholder is debited and, correspondingly, the merchant's bank account at Merchant Financial Institution (FI) 18 is credited with a corresponding amount minus any fees charged by issuer 20 and any others, such as merchant acquirer 16 and possibly network payment processor 26 and/or ACH processor 22 or others in the processing chain. In accordance with embodiments of the invention, the mobile decoupled payments account issuer 20 of the present invention bears the risk of payment and settlement occurs even if the DDA at Financial Institution 24 had insufficient funds for the purchase transaction.

With reference now to FIG. 5, process and information flow in embodiments of the present invention in which the decoupled mobile payments account of the present invention is associated with a network payment processor such as Visa, MasterCard, American Express or Discover are illustrated and described. In particular, the information flow presented in FIG. 5 occurs via the systems and operating environment 10 including communications network(s) 28 illustrated in FIG. 1 when the mobile payments accountholder enrolled into the mobile decoupled payments account with a debit account such as a debit card number.

Mobile device 12 transmits an identifier to merchant POS terminal 14 as indicated at step 5A. As will be understood from the foregoing, such transmission may be to a remote POS terminal 14 or to a local POS terminal in proximity to the mobile device 12 (such as with NFC). As indicated by step 5B, information pertaining to the purchase transaction, such as merchant information, the monetary amount of the purchase transaction, and the identifier transmitted from the mobile device 12 is sent to the merchant acquirer 16 for the purpose of authorizing the purchase transaction. Merchant acquirer 16 receives the information and, based upon the identifier transmitted from the mobile device (such as possibly by a first numerical digit of the identifier), determines the identity of the network payments processor 26 and transmits payment information to the network payments processor 26 (step 5C). For example, if the decoupled mobile payment account of the present invention is a Visa account, the networks payment processor 26 is Visa and the payment information is transmitted to Visa, where mobile decoupled payments account issuer 20 is identified based upon the identifier.

At step 5D, the network payments processor 26 transmits the transaction information to mobile decoupled payments account issuer 20. In accordance with the invention, a risk assessment on the purchase transaction is performed using a computer-implemented risk assessment method. The risk assessment may utilize a variety of information (including but not limited to general transaction history of the customer accountholder, recent transaction history on the account, the amount of the transaction, the location of the transaction, etc.) to make a determination of whether the purchase transaction carries more than a desired risk, such as risk of fraud or insufficient funds. The risk assessment methodology may be implemented on one or more servers at the merchant acquirer 16, payments network processor 26, or mobile decoupled payments account issuer 20. Based upon the risk assessment, an electronic message approving or denying the transaction is sent to merchant POS terminal 14. As illustrated, such a message is sent from mobile decoupled payments account issuer 20 via network processor 26 (step 5E) to merchant acquirer 16 (step 5F) and on to the merchant POS terminal 14 (step 5G) for output at the POS terminal 14.

When the purchase transaction is approved (either by mobile decoupled payments account issuer 20 or on its behalf by merchant acquirer 16 or network payments processor 26 according to established criteria), mobile decoupled payments account issuer 20 causes an ACH transaction to be initiated and sent via ACH payments processor 22 (as indicated at steps 5H and 5I) to withdraw money in an amount corresponding to the purchase transaction from the DDA of the accountholder at financial institution 24.

When the DDA has sufficient funds for the purchase transaction (or is utilizing overdraft protection via a credit account or alternate account), the requested money is withdrawn from the DDA and deposited in the mobile payments account of the accountholder (via ACH processor 22 as indicated by steps 5J and 5K) where the money is held for later settlement of the purchase transaction. In particular, the DDA is debited and the mobile payments account is credited in an amount corresponding to the purchase transaction. In accordance with the invention, additional information regarding the purchase at POS terminal 14, such as the merchant identity and possibly the date and time of the purchase transaction, is transmitted, preferably with the ACH transaction at steps 5H and 5I, to the accountholder's financial institution 24 where it is available for review by the accountholder (such as online) and is available for placement on a statement associated with the DDA.

Additionally, the money deposited from the accountholder's DDA into the decoupled mobile payments account is electronically marked and held as a pending transaction. In this manner, the money is not available for withdraw or transfer from the decoupled mobile payments account other than by a valid settlement request concerning the payments transaction at POS terminal 14 with which the money is associated.

When the DDA does not have sufficient funds for the purchase transaction (and does not have sufficient overdraft protection, etc.), a message is sent back via ACH processor 22 (steps 5J and 5K) indicating that the ACH transaction will not be completed with a funds transfer. In the event of either sufficient funds transferred or insufficient funds at the DDA, risk assessment data associated with the accountholder is updated (either at mobile decoupled payments account issuer 20 or by sending the information concerning payment or non-payment to network processor 26 or merchant acquirer 16 for updating the risk assessment data on the accountholder). Additionally, in accordance with an aspect of the invention, when the purchase transaction was approved and yet the DDA had insufficient funds to cover the purchase transaction, the mobile payments account issuer 20 bears the risk and responsibility of making payment and makes its own funds available to settle the purchase transaction at the time of settlement.

The purchase transaction is settled when merchant acquirer 16 initiates a settlement request to mobile decoupled payments account issuer 20. In particular, as illustrated, an electronic settlement instruction concerning the purchase transaction is transmitted at step 5L from merchant acquirer 16 to network payments processor 26 and from processor 26 at step 5M to mobile decoupled payments account issuer 20. Funds corresponding to the purchase transaction (less one or more fees, which fees may include a transaction fee and/or a fee for taking the risk of guaranteeing the transaction) are withdrawn from the accountholder's decoupled mobile payments account and transferred to processor 26 (step 5N) (who will likely discount further the amount transmitted on via step 5O to merchant acquirer 16 by a transaction fee). Ultimately, an amount of money corresponding to the purchase transaction discounted by fees charged by mobile payments account issuer 20, network payments processor 26 and merchant acquirer 16 are deposited into a bank account of the merchant (via step P) at the merchant's financial institution 18. It should be understood that the settlement instruction corresponding to the purchase transaction may be an individual message or part of a batch file for batch processing by network payments processor 26. Additionally, it should be understood that the settlement may occur at a time that is later than the purchase transaction (such as later that day or overnight) or settlement may occur in real- or substantially-real time with the purchase transaction.

With additional reference to FIG. 6, process and information flow in embodiments of the present invention in which the decoupled mobile payments account of the present invention utilizes an ACH-direct payment account are illustrated and described.

As will be understood from the specification herein, during a purchase transaction, mobile device 12 transmits an identifier, corresponding to the mobile payments account, to the Merchant POS terminal 14 at step 6A. Information pertaining to the purchase transaction (such as the mobile payments account identifier, merchant identification, monetary amount of purchase, and optionally date and time) is transmitted to merchant acquirer 14 at step 6B. Merchant acquirer 14, based upon the received mobile account identifier, determines the decoupled mobile account issuer 20 and makes a risk assessment on behalf of issuer 20 for approving or denying the transaction and/or transmits the information pertaining to the purchase transaction to the issuer 20 at Step6 C, in which case the decoupled mobile payments account issuer 20 makes a risk assessment concerning the transaction, approves or declines the transaction, and transmits a corresponding approval/declined message back to merchant acquirer 16 at step 6D. Merchant acquirer 16 transmits the message to POS terminal 14 at step 6E for completing authorization or declination of the purchase transaction. In the event the purchase transaction was approved or declined on behalf of the mobile decoupled payments account issuer 20 by the merchant acquirer (or another entity) based upon criteria established by or in conjunction with mobile decoupled payments account issuer 20, a message is electronically sent to mobile decoupled payments account issuer 20 indicative of the transaction and its approval or denial.

When the purchase transaction is approved, mobile decoupled payments account issuer 20 initiates an ACH transaction with ACH processor 22 for withdrawing monetary funds in an amount corresponding to the purchase transaction from the accountholder's DDA at Financial Institution 24 and transmitting those funds to the decoupled mobile payments account where the funds are held for settlement of the purchase transaction, as indicated by steps 6F, 6G, 6H, and 6I. In particular, the accountholder's DDA is debited in an amount corresponding to the purchase transaction and the decoupled mobile payments account is credited by that amount (less any fee allocated for the ACH transaction, if any such fee is allocated at the time of the transaction by the ACH processor). Additionally information pertaining to the purchase transaction (such as merchant, date and/or time information) is also electronically transmitted to the financial institution 24.

Settlement of the purchase transaction is initiated when the merchant associated with POS terminal 14 or merchant acquirer 16 electronically transmits a settlement instruction. In one embodiment, illustrated as settlement initiated by the merchant acquirer 16 on behalf of the merchant, information pertaining to the purchase transaction is transmitted to the merchant's financial institution 18 as indicated at step 6J. Financial institution 18 then initiates an ACH transaction via ACH processor 22 with mobile decoupled payments account issuer 20 for settlement of the purchase transaction and funds corresponding to the purchase transaction, minus fees (which may include a transaction and/or funds guarantee fee), are transferred from the mobile decoupled payments account of the accountholder to the merchant's bank account at Financial institution 18, as indicated by steps 6K, 6L,6M, and 6N. In particular, the mobile decoupled payments account is debited by an amount corresponding to the purchase transaction and the bank account of the merchant at financial institution 18 is credited by that amount discounted by the fees charged by issuer 20 and others, such as merchant acquirer 16 (and possibly ACH processor 22).

Alternatively, settlement of the purchase transaction is accomplished by a computer-implemented push methodology when the merchant or, as illustrated, merchant acquirer 16 transmits a settlement instruction directly to decoupled mobile payments account issuer 20, as indicated at step 60. In response, mobile decoupled payments account issuer 20 initiates an ACH transaction with the merchant's Financial Institution 18 via ACH processor 22, as illustrated at steps 6P and 6Q, resulting in an amount corresponding and having been designated for the purchase transaction, discounted by one or more fees charged by the mobile payments account issuer 20, to be transmitted to an account of the merchant at financial institution 18. A message (not shown) regarding the settlement may be transmitted back to merchant acquirer 16 (or merchant) by issuer 20, ACH processor 22 or financial institution 18. In particular, an amount corresponding to the purchase transaction is debited from the accountholder's decoupled mobile payments account at issuer 20 and credited to the account of the merchant at financial institution 18.

Figure 7:
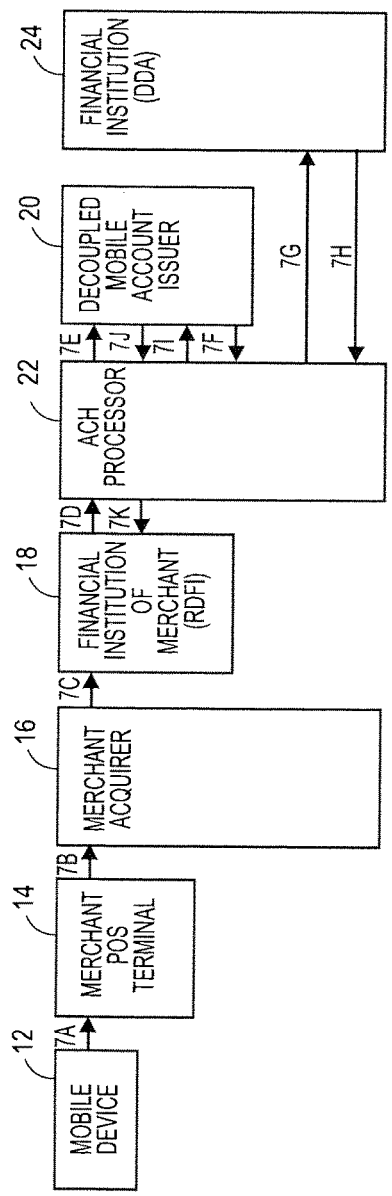
FIG. 7 is a flow diagram illustrating a value exchange transaction according to embodiments of the present invention.

With additional reference to FIG. 7, process and information flow in an alternate embodiment of the present invention in which the decoupled mobile payments account of the present invention utilizes an ACH-direct payment account and approach are illustrated and described.

In the embodiment of the invention illustrated in FIG. 7, rather than the merchant or merchant acquirer 16 initiating the transaction directly with mobile decoupled payments account issuer 20, the payment is initiated from the mobile device 12 (step 7A) and the merchant acquirer 16 receives information pertaining to the purchase transaction (step 7B) and transmits the information pertaining to the purchase transaction directly to the merchant's financial institution 18 (step 7C) (similar to an electronic check) who initiates an electronic transaction with mobile decoupled payments account issuer 20 via ACH processor 22 (steps 7D and 7E). In accordance with the invention, upon receipt at mobile decoupled payments account issuer 20 of the transaction, the transaction is held in a pending state while mobile decoupled payments account issuer 20 initiates a second ACH transaction with financial institution 24 for retrieving from the accountholder's DDA an amount of money corresponding to the purchase transaction as illustrated at steps 7F, 7G, 7H and 7I. Upon receipt of the funds at issuer 20, the pending initial transaction is settled with money in an amount corresponding to the purchase transaction, discounted by any fees of the mobile decoupled payments account issuer 20, being transmitted via ACH processor 22 to the merchant's account at the merchant's financial institution 18 as illustrated at steps 7J and 7K. Understandably, additional authorization and/or settlement messages may be electronically sent to merchant acquirer 16 and/or the merchant, including for example an authorization signal from merchant acquirer 16 back to POS terminal 14 indicating that the form of payment is accepted.

Figure 8:
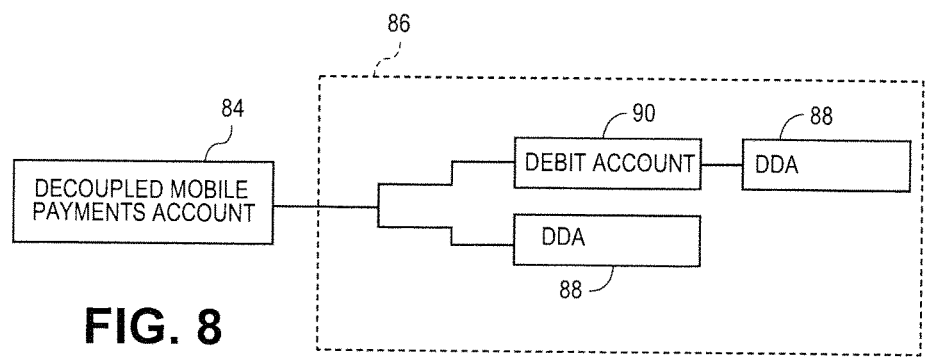
FIG. 8 is a schematic representation of a mobile decoupled payments account of the present invention.
Figure 9:
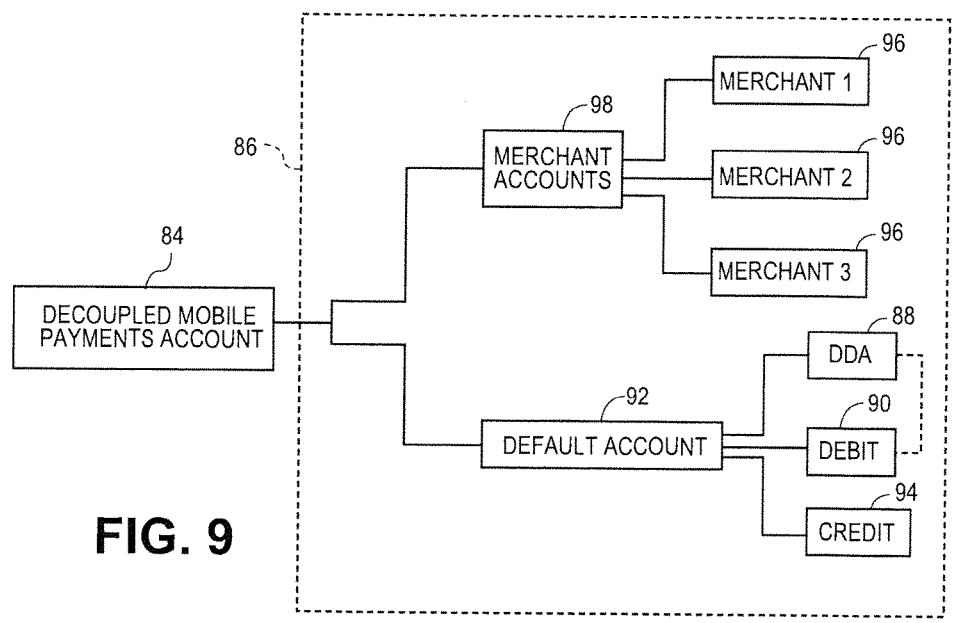
FIG. 9 is a schematic representation of further embodiments of a mobile decoupled payments account of the present invention.

With additional reference to FIGS. 8 and 9, the mobile decoupled payments account and associated account(s) in accordance with the present invention are schematically illustrated and described.

With reference to FIG. 8, decoupled mobile payments account is denoted by reference numeral 84. As described, decoupled mobile payments account 84 is a first account of an accountholder that is used via a mobile device 12 for making payments at local or remote points of sale terminals. The mobile decoupled payments account 84 is issued by an issuing entity 20. In embodiments of the invention, issuer 20 may be, or may be affiliated with, a mobile carrier, a mobile device manufacturer, or a mobile operating system provider. As illustrated, a second account denoted generally by reference numeral 86 is associated with the mobile payments account. As described herein, the second account preferably comprises a Demand Deposit Account (DDA) 88 at a financial institution 24 of the accountholder, where that DDA 88 is associated directly with the mobile payments account 84 that is decoupled from the DDA or is associated with the mobile payments account 84 via a debit account or identifier 90, such as an account of a payments network provider/processor such as Visa, MasterCard, American Express or Discover.

With reference to FIG. 9, additional features and embodiments of the decoupled mobile payments account and associated accounts are graphically illustrated and described.

Illustrated is the decoupled mobile payments account 84 with associated payments accounts 86. In particular, associated payments account includes a default account 92 that is one of DDA 88, Debit Account 90 tied to DDA 88, a credit account 94. During the enrollment process described above, the accountholder may enter one or more of accounts 88, 90 and 94 and select one of them as a default account 92. Additionally, associated accounts 88 include one or more merchant accounts 96 stored in a merchant accounts folder 98. Each merchant account 96 corresponds to a particular merchant and is accepted only at the merchant corresponding to the merchant account.

In accordance with the invention, money may be transferred to decoupled mobile payments account 84 in the manners described herein. Additionally, the accountholder may transfer funds directly to the mobile payments account from another credit or debit account of the accountholder (subject to fees) either directly via an ACH transaction or via a networks payment processor 26 such as Visa or MasterCard. Additionally, the accountholder may purchase or be given a merchant account 96 and transfer money to the merchant account 96. Additionally, others may transfer money into the accountholder's mobile payments account 84 using a wireless or Internet person-to-person transfer and, further, others may transfer money into a merchant account 96 of the accountholder via a wireless or Internet person-to-person transfer. Such a transfer from another to mobile payments account 84 or an associated merchant account 96 may include a message, such as a text-message sent by a messaging service such as SMS. In this way, for example, money owed to the accountholder may be paid directly to the accountholder's mobile payments account 84 and merchant-specific monetary gifts from others may be given directly to a merchant account 96 for use by mobile payments account 84.

Additionally, affiliate payments to an accountholder or payments for sales of a software application developed or owned by the account holder, such as sales of mobile applications from an online application store, may be paid to an accountholder's mobile payments account of the present invention.

Figure 10:
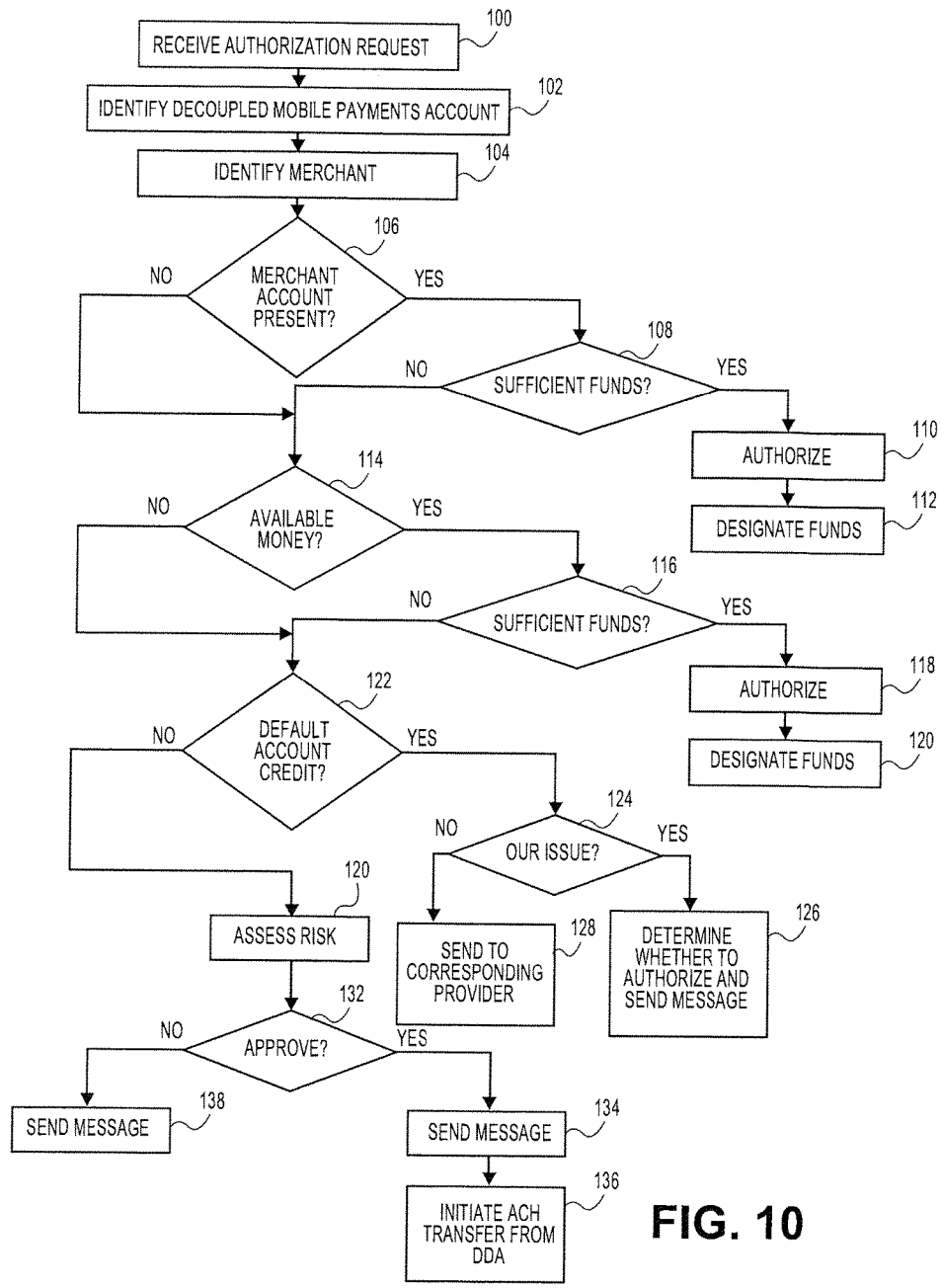
FIG. 10 is a flow chart illustrating a computer-implemented mobile decoupled payments method of exchanging value according to embodiments of the invention.

With reference now to FIG. 10, embodiments of a computer-implemented method, such as may be implemented on server 32 of mobile decoupled payments account issuer 20, of the present invention for facilitating a value exchange are illustrated and described.

At step 100, mobile decoupled payments account issuer 20 receives a request to authorize a purchase transaction being made at a merchant POS terminal 14 with a mobile payments account 84 via mobile device 12.

At steps 102 and 104, the mobile decoupled payments account 84 and the merchant at which the purchase transaction is being made are identified from information received in the authorization request at step 102.

At step 106, server 32 determines, using the computer-implemented method of the present invention, whether a merchant account 96 that corresponds with the merchant identified at step 104 is presently associated with payments account 84. When it is determined at step 106 that a merchant account 96 of the merchant is associated with mobile payments account 84, processing advances to step 108.

At step 108, it is determined whether the identified merchant account corresponding to the merchant at which the purchase transaction is being made has sufficient funds for processing the purchase transaction. When it is determined at step 108 that the merchant account does have sufficient funds for covering the purchase transaction, the purchase transaction is approved and an authorization/approval message is sent to the point of sale terminal 14 at step 110 and an amount of money corresponding to the purchase transaction is designated for the purchase transaction at step 112 and thus made at least temporarily unavailable for use or withdrawal other than upon receipt of a valid instruction to settle the purchase transaction.

When it is determined at step 106 that a merchant account corresponding to the merchant at which the purchase transaction is being made is not presently associated with the mobile decoupled payments account or it is determined at step 108 that the merchant account does not have sufficient funds to cover the purchase transaction, processing advances to step 114.

At steps 114 server 32 utilizing the computer-implemented method of the present invention determines whether mobile payments account 84 has available money. If money is available in mobile payments account 34, it is determined at step 116 whether the amount of money in mobile payments account 34 is sufficient to cover the purchase transaction. When it is determined at step 116 that sufficient money is available in mobile payments account 84 to fund the purchase transaction, the purchase transaction is authorized at step 118 and an amount of money corresponding to the purchase transaction is designated at step 120 and thus made at least temporarily unavailable for use or withdrawal other than upon receipt of a valid instruction to settle the purchase transaction.

When it is determined at step 114 that money is not available in mobile payments account 84 or that the funds in mobile payments account 84 are insufficient to cover the purchase transaction, processing advances to step 122. It should be understood that the illustrated steps 114 and 116 may be combined into a single step.

At step 122, it is determined whether the default payment account 92 is a credit account 94. When a credit account04 is the default payment account 92, it is determined at step 124 whether the credit account was issued by mobile decoupled payments account issuer 20 or another source. When the credit account has been issued by issuer 20, a determination is made at step 126 whether to approve or decline the purchase transaction and a corresponding message is sent to POS terminal 14 at which the purchase transaction is being made. The determination made at step 126 may be based upon credit limit, available credit, fraud-controls, etc. When it is determined that the credit account 94 is an account of another issuer, processing is forwarded to the corresponding provider of the credit account 94, as indicated at step 128, and a processing fee may be charged.

When it is determined at step 122 that the default account is not a credit account, processing advances to step 130 and risk associated with the purchase transaction being made is assessed. Such risk assessment may take into account recent and historical purchase activity, credit worthiness of the accountholder, the location and amount of the purchase, etc. At step 132, a decision to approve or decline the purchase transaction is made. When approved, processing advances to step 134 and an approval message is sent to POS terminal 14 at which the purchase transaction is being made and, in accordance with the invention as described herein, mobile decoupled payments account issuer 20 initiates an ACH transaction as indicated at step 136 with the DDA 88 of the accountholder at financial institution 24 to obtain funds for settlement of the transaction. When at step 132 the purchase transaction is declined based upon the risk assessed at step 130, a message declining the purchase transaction is sent to POS terminal 14 as indicated at step 138. Risk assessment data associated with the accountholder is updated.

It should be understood and appreciated that the present invention may be employed without one or more of the credit account 94 or merchant accounts 96 and that processing would accordingly reflect the presence or absence of such accounts. In particular, however, when such accounts are present, as illustrated and described, the computer-implemented method of the present invention first employs an available and sufficiently funded merchant-specific account, then the mobile payments account itself, and then the default account which, according to one embodiment of the invention, is preferably a DDA. Additionally, although processing has been described as using one of the accounts 96, 84, or 92, it should be understood that embodiments of the invention may permit processing the purchase transaction as a split-transaction such that a first portion of the transaction is settled with funds designated from one of the associated accounts 86, a second portion of the transaction is settled with funds designated from a different one of the associated accounts 86, and so on as necessary. For example, a specific merchant account 96 corresponding to the merchant at which the purchase transaction is being made may have funds but not enough funds to cover the purchase transaction. In such a case, the funds available in the merchant account 96 may first be exhausted and then computer-implemented method of the invention will next use any available funds in mobile payments account 84 until those are exhausted and will then use default account 92 for any remainder amount owed. When a corresponding merchant account 96 is not present, processing may split a transaction to first use available non-designated funds from mobile payments account 84 and a remainder amount using default account 92.

From the foregoing, settlement of a purchase transaction approved according to the computer-implemented methodology illustrated and described in FIG. 10 will be understood. In particular, an amount of money corresponding to the monetary amount of the purchase transaction discounted by one or more fees charged by the mobile decoupled payments account issuer 20 and as was designated from a merchant account 96, from the mobile payments account 84, or retrieved from DDA 88 will be transmitted to the merchant's bank account at financial institution 18. Settlements of split transactions will use funds having been correspondingly designated from different ones of the associated accounts 86. In the event of a credit transaction involving a credit account issued by or in conjunction with the issuer 20, money loaned to the accountholder for completing the purchase transaction will be transmitted.

Statements indicating transactions made using mobile decoupled payments account 84 and details of those transactions are sent to the accountholder on a periodic basis. Such statements may be electronically delivered to, or electronically retrieved via, a personal computer used by the accountholder or via mobile device 12. Alternatively or additionally, such statements may be mailed to a physical address of the accountholder. Additionally, such statements may be incorporated with a subscriber statement issued by a mobile carrier associated with the mobile payments account 84.

In accordance with an additional aspect of the present invention, the mobile payments account 84 is (or is associated with) a credit account that makes an amount of credit available to the accountholder for making purchases and paying bills. A Demand Deposit Account (DDA) from an institution other than the issuer of the mobile payments account 84 is linked by the account holder to the mobile payments account 84. As is known, purchase authorization decisions are based on the available credit limit of the account 84. In particular, however, in accordance with the invention, each purchase transaction posted to the credit account 84 automatically results in a monetary amount corresponding to the purchase amount being presented via the ACH network to the linked DDA 84 to withdraw a monetary amount corresponding to the purchase. Accordingly, this particular embodiment of the invention operates to automatically keep the full available credit limit available so long as the DDA has sufficient funds for funding or satisfying the amount of the purchase transaction. In particular, according to this embodiment of the invention, the accountholder does not have an option or choice to leave amounts corresponding to purchases on the credit account. When, however, the DDA has non-sufficient funds for satisfying the ACH request, the system of the present invention first re-presents the matter. In the event the re-presentment fails, then the amount corresponding to the purchase transaction remains on the credit account and is owed by and billed to the account holder (subject to interest and other fees according to the terms of the account holder agreement with the issuer of the account). Accordingly, in one embodiment, the amount charged to the credit account reduces the credit available and, in a subsequent request for authorization of a purchase using account 84, the system of the present invention will use the available credit amount in determining whether to authorize a transaction. Alternatively, any amount owed on the credit account will result in subsequent purchase attempts with the account 84 being declined until the balance if paid in full. Accordingly, the invention provides risk mitigation for the issuer and built-in credit restraints for the account holder.

In a variation, in the case in which the first account—the mobile payments account 84—is a credit account, an account for storing funds (such as a stored value or prepaid type of account) provided by the same issuer (or partnership) is linked to the credit account. Purchase authorizations may be made based upon comparison of the purchase amount with a fixed credit-limit amount, an available credit limit amount, or the sum of an amount stored in the linked account and a fixed credit limit or available credit. As described, an embodiment of the invention requires that all amounts credited to the credit account are processed for payment via an account that is linked to the credit account. In this particular embodiment, settlement processing first takes into consideration the amount of funds in the stored value/prepaid account and withdraws or places a hold on funds in the stored value/prepaid account and then makes an ACH presentment to a Demand Deposit Account (DDA) linked to the stored value/prepaid account for any remaining monetary amount required to satisfy or cover the monetary amount of the purchase transaction. As described, in the event of non-sufficient funds in the DDA, any amount of the purchase transaction not funded from the stored value/prepaid account is applied to the credit account, thus lowering the amount of available credit or preventing authorization of future transactions with account 84 until the balance is paid in full. Alternatively, prior to making an ACH presentment to the DDA, any remaining amount of the purchase transaction that is not covered by funds available in account 84 are first credited to the credit account and then an ACH presentment of that amount is made to the DDA. As described, in the event of non-sufficient funds in the DDA, any amount of the purchase transaction not funded from the stored value/prepaid account is applied to the credit account, thus lowering the amount of available credit or preventing authorization of future transactions with account 84 until the balance is paid in full.

As stated above, the mobile payment account 84 may store funds. Thus, the account 84 itself operates as a stored value or prepaid type of account. In one embodiment of the invention, authorization decisions are based on a fixed limit of credit risk that the issuer of the account 84 is willing to undertake. Alternatively, electronic processor-based decisions to authorize or decline a purchase transaction being attempted with mobile payment account 84 may compare the monetary amount of the purchase transaction with the sum of the amount of money stored in the mobile payment account and a fixed amount of credit risk that the issuer is willing to undertake for the account holder. Accordingly, if the monetary amount of the purchase transaction is less than or equal to the amount of funds stored in the mobile payment account 84, the transaction is authorized. Similarly, if the monetary amount of the purchase transaction is less than or equal to the sum of the amount of funds stored in the mobile payments account plus a fixed amount corresponding to credit risk that the issuer (or its partner(s)) is/are willing to undertake for the account holder, then the purchase transaction is authorized and a corresponding approval message is transmitted. Alternatively, if the monetary amount of the purchase transaction exceeds the sum of the monetary amount stored in the mobile payments account 84 and the amount of credit risk that the issuer (or its partner(s)) is/are willing to undertake for the account holder, then the purchase transaction is declined and a corresponding declined message is transmitted.

Additionally, as described above, the mobile payments account 84, capable of storing funds, and a credit account linked directly to the mobile payments account may be issued by the same issuer. The issuer may be in partnership with one or more other entities in such offering. In such a scenario, decisions and operations concerning authorization of purchase transactions may be made as just described. In accordance with a particular embodiment of the invention, funds for settling a purchase transaction may be taken first from funds stored in or in association with the payments account 84 with a remainder of the amount owed being applied to the linked credit account. In accordance with a particular aspect of one embodiment of the invention, as described above, any amounts posted to the credit account result in the system of the present invention automatically presenting an ACH request to a DDA 88 of the account holder, at another financial institution, that is linked to the credit account with no ability of the accountholder to choose to leave a charge applied to the credit account. Funds withdrawn from the linked DDA 88 are used for settlement or, as will be understood, to compensate for settlement already made by the issuer of mobile payments account 84. In accordance with the invention, only when the DDA 88 has non-sufficient funds is an amount applied to the credit account (which, in turn, reduces the available credit used when determining whether to authorize additional purchases). It should be understood that aspects of the invention may be employed in both open-loop or closed-loop payment systems and are applicable to a wide variety of mobile and non-mobile communication, media and social networking accounts.

Figure 11:
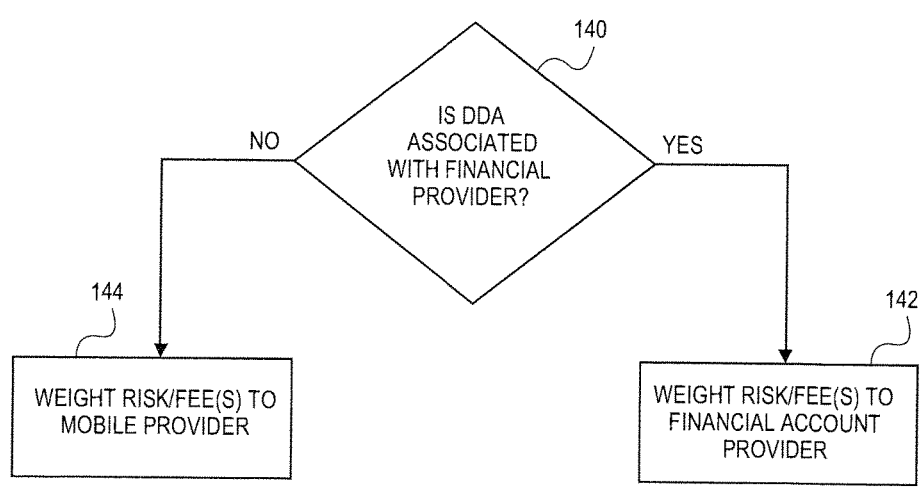
FIG. 11 is a flow chart illustrating a method of embodiments of the present invention for allocating risk and a fee.

In a variation, when a credit account is linked to a prepaid account according to the present invention, processing during settlement of a purchase transaction involving a monetary amount involves automatically retrieving funds from the first account to cover at least a portion of the monetary amount corresponding to the purchase transaction to the extent funds are available in the prepaid account, then automatically initiating an ACH presentment to withdraw money, from the demand deposit account, corresponding to a remaining monetary amount comprising the monetary amount less the amount of funds retrieved from the first account, and then, when the demand deposit account has non-sufficient funds to fund said remaining monetary amount and the ACH presentment ultimately fails, charging the remaining amount to the credit account, thereby loaning the remaining monetary amount to the account holder. With reference to FIG. 11, a system and method for allocating risk, allocating fees, or allocating risk and corresponding fees are illustrated and described.

In particular, in accordance with an aspect of the invention, as described, a mobile payments account issuer or provider 20 may be a financial institution. That provider 20 may itself provide financial services include Demand Deposit Accounts (DDAs) to its customers. According to the invention, as set forth at step 140 of FIG. 11, when processing a transaction made with the mobile decoupled payment account of the present invention, system 10 determines whether the DDA coupled with the mobile payments account is a DDA of a financial provider associated with provider 20. When it is determined at step 140 that the mobile decoupled debit account of the present invention is an account associated with provider 20, processing advances to step 142 and the financial risk (such as a guarantee between authorization and settlement) is weighted to the financial account provider associated with provider 20. Such a weighting may be any percentage allocation agreed upon between the financial account provider and the mobile provider (include 100%/0), but preferably the financial provider receives the greater benefit since the DDA is an account of that financial provider. Additionally, a fee or fees associated with the transaction are correspondingly weighted to the financial provider. It should be understood that the risk allocation and fee allocation may match or not match. For example, one scenario specifically contemplated and within the scope of the present invention is that the financial provider bears all risk for its own DDA accounts but still shares a small percentage of the fee(s) with the mobile provider for transactions involving its DDAs. The allocated fees may include interchange or interchange-type fees only, transaction processing fees and/or assessments only, or a combination of interchange or interchange-type fees and transaction processing fees/assessments.

When it is determined at step 140 that the mobile payments account used in the transaction is not coupled with a DDA of the financial provider associated with the mobile provider, processing advances to step 144 at which the risk and fee(s) associated with the transaction are weighted toward the mobile provider. Again, such a weighting may be any percentage allocation agreed upon between the financial provider and the mobile provider (include 0%/100%), but preferably the mobile provider takes the greater risk and receives the greater percentage of the fee(s) (although not all). It will be appreciated that numerous arrangements are possible within the scope of the invention.

This unique risk and fee allocation aspect of the invention enables benefits a financial partner by enabling it to grow its fees through the mobile channel without sacrificing or significantly sacrificing fee income related to payments that it would receive on its DDAs. The mobile provider gains the support and knowledge of a financial partner that may be an account-issuing partner and gains the ability to work with a single financial provider in a close relationship and does not need to partner with all financial partners or with a network of financial partners to enable mobile payments, thereby giving it greater flexibility in establishing fee allocation with its financial partner.

Although the unique risk and fee allocation aspect of the invention has been described with respect to a mobile carrier provider and financial provider, variations are possible and within the scope of the present invention. For example, in addition to the mobile partner being a wireless carrier, a mobile handset maker, or a provider of a mobile operating system, the mobile partner could be a joint venture of one or more such entities. Additionally, it will be appreciated that the unique risk and fee allocation features of the invention may be employed with first and second parties of other or different types of entities. For example, a payments processing company (such as a company that processes payments for banks) for a plurality of financial institutions may establish a relationship with a mobile provider such that all financial institutions serviced by the payments processing company get the benefit of a greater percentage of payments fee revenue for mobile payments. For example, a bank, corresponding to a bank account associated with a mobile payment account, that is serviced by the payments processing company would receive a higher percentage of a payments fee than would a bank, corresponding to a bank account associated with the mobile payment account, which is not serviced by the payments processing company. In a variation of this approach, only those banks that are already serviced by the payments processing company when the payments processing company forms an agreement with a mobile partner benefit from the beneficial fee allocation, whereas banks that adopt services of the payments processing company after the relationship with a mobile partner is formed do not benefit from the more beneficial fee allocation. As another example, a company that originates payments accounts for a mobile payment network or provider may get a more beneficial fee allocation according to the principles of the present invention.

From the foregoing it will be seen that this invention is one well adapted to attain all ends and objects hereinabove set forth together with the other advantages which are apparent and which are inherent to the structure.

As described, it will and should be understood that the invention may be employed with open-loop payments networks, closed-loop payment networks, online networks, and/or offline networks and may require, involve or employ a signature or PIN-entry at the POS terminal (or such requirements may be waived) without limitation. Additionally, it should be understood that certain aspects of the invention may be employed and are useful for payments initiated with an article other than a mobile communications device, such as an NFC-enabled article, tag, watch, wrist-band, bracelet, key-chain, ring, etc.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A system comprising:
a mobile communications device;
a user-interface accessible on said mobile communications device, wherein said user interface facilitates enrollment by a user of the mobile communications device in a mobile payment program, wherein said mobile payment program enables the mobile communications device to be used to make payments for purchases at point of sale terminals in retail stores;
wherein said system enables (i) a plurality of payment accounts to be associated with said mobile communications device and (ii) functionality accessible at the mobile communications device that enables the user to use the mobile communications device to select one of the plurality of payment accounts for use in making payment for a purchase using the mobile communications device;
a user-account, wherein said user-account enables electronic access to a service that is accessible via the mobile communications device,
a first payment account, wherein said first payment account is stored in said system in association with said user-account and wherein said first payment account is used to make payments to said source of said service;
wherein the user of the mobile communications device uses the mobile communications device to enroll into said mobile payment program,
wherein said user-account and said first payment account associated with said user-account are pre-existing to the enrollment by the user into said mobile payment program,
said system enables, during said enrollment into said mobile payment program, an option for the user to select, for use as a source of funds for payments made using said mobile communications device, (i) the first payment account or (ii) to enter account information of an account of the user other than said first payment account,
wherein, during said enrollment into said mobile payment program, said first payment account is optionally selected by the user as the source of funds for payments made using said mobile communications device;
wherein, based on said enrollment, said system enables assignment of a unique encoded identifier,
wherein said unique encoded identifier is stored in said mobile communications device, and
wherein, when said mobile communications device is used by the user to make a payment for a purchase in a retail store, said encoded identifier is transmitted from said mobile communications device to at least one of a point of sale terminal in the retail store and an electronic server in an electronic payment system used by the retail store and said encoded identifier is used to identify said first payment account so that said first payment account is used in processing the payment.

2. The system of claim 1 further comprising a second payment account, wherein information indicative of said second payment account is stored in said system and said second payment account is available for selection by the user using said mobile communications device for use in making payments with the mobile communications device.

3. The system of claim 2, wherein use of the second payment account for making payments for purchases has an associated credit risk to a provider of the second payment account, and wherein said credit risk is borne at least in part by a source of said mobile communications device.

4. The system of claim 3, wherein said use of said second payment account generates a fee and wherein said provider of said mobile communications device receives at least a portion of said fee.

5. The system of claim 2, wherein use of the second payment account for making payments for purchases has an associated credit risk to a provider of the second payment account, and wherein a source of said mobile communications device participates at least in part in said credit risk.

6. The system of claim 5, wherein said use of said second payment account generates a fee and wherein said provider of said mobile communications device receives at least a portion of said fee.

7. The system of claim 2, wherein use of the second payment account for making payments for purchases has an associated credit risk to a provider of the second payment account, wherein a credit amount corresponding to said credit risk is financed at least in part by said source of said mobile communications device.

8. The system of claim 7, wherein said use of said second payment account generates a fee and wherein said provider of said mobile communications device receives at least a portion of said fee.

9. The system of claim 1, wherein said second payment account comprises a credit account.

10. The system of claim 1, wherein said second payment account comprises a decoupled debit account.

11. The system of claim 1, wherein said use of said second payment account generates a fee and wherein said provider of said mobile communications device receives at least a portion of said fee.

12. The system of claim 1, wherein said provider of said second payment account is said source of the mobile communications device.

13. The system of claim 1, wherein said provider of said second payment account comprises a financial institution.

14. The system of claim 1, wherein said mobile communications device comprises a cellular telephone.

15. The system of claim 1, wherein said mobile communications device comprises a wearable electronics device.

16. The system of claim 2, wherein said second account comprises a prepaid account.

17. The system of claim 2, wherein an authorization to approve a use of said second account for making payment for a purchase transaction comprises comparing a monetary amount of said purchase transaction with a sum of (i) a balance of funds available for use by said second account and (ii) an amount of available credit.

18. The system of claim 17, wherein a settlement of said purchase transaction using said second account comprises a combination of withdrawing funds from said balance of funds and using said available credit.

19. The system of claim 2, wherein said second account enables access to a balance of monetary funds and to available credit for paying for a purchase transaction using said second account.

* * * * *